(12) United States Patent
Strub

(10) Patent No.: US 12,089,756 B2
(45) Date of Patent: Sep. 17, 2024

(54) COMBINATION FOOD COOLER AND FOOD COVER

(71) Applicant: Colin Strub, Denver, CO (US)

(72) Inventor: Colin Strub, Denver, CO (US)

( * ) Notice: Subject to any disclaimer, the term of this patent is extended or adjusted under 35 U.S.C. 154(b) by 890 days.

(21) Appl. No.: 17/098,087

(22) Filed: Nov. 13, 2020

(65) Prior Publication Data

US 2021/0330107 A1 Oct. 28, 2021

Related U.S. Application Data

(60) Provisional application No. 63/014,012, filed on Apr. 22, 2020.

(51) Int. Cl.
  *A47J 37/06* (2006.01)
  *A47G 19/26* (2006.01)
  *A47J 39/00* (2006.01)
  *F25D 17/06* (2006.01)

(52) U.S. Cl.
  CPC .......... *A47G 19/26* (2013.01); *A47J 37/0641* (2013.01); *A47J 39/006* (2013.01); *F25D 17/06* (2013.01)

(58) Field of Classification Search
  CPC ..... A47J 37/0641; A47J 39/003; A47J 39/006
  USPC .......................................... 99/474, 476, 483
  See application file for complete search history.

(56) References Cited

U.S. PATENT DOCUMENTS

| | | | |
|---|---|---|---|
| 3,857,254 A * | 12/1974 | Lobel ....................... | A23B 4/00 62/93 |
| 4,468,932 A | 9/1984 | Bullard | |
| 4,788,905 A | 12/1988 | Von Kohorn | |
| 5,060,479 A | 10/1991 | Carmi et al. | |
| 5,062,281 A | 11/1991 | Oliphant et al. | |
| 5,782,094 A | 7/1998 | Freeman | |
| 5,930,454 A * | 7/1999 | Cho ....................... | F25D 17/065 392/382 |
| 5,953,933 A | 9/1999 | Cheng | |
| 6,571,568 B1 * | 6/2003 | Link .................. | B60H 1/00264 62/421 |
| 6,747,250 B1 * | 6/2004 | Cha ..................... | A47J 37/0623 219/400 |
| 6,763,665 B2 | 7/2004 | Clark et al. | |

(Continued)

FOREIGN PATENT DOCUMENTS

DE 102016103940 B3 1/2017
JP 2005-536218 A 12/2005

(Continued)

*Primary Examiner* — Reginald Alexander
(74) *Attorney, Agent, or Firm* — James B. Conte; Craig R. Miles; CR MILES P.C.

(57) ABSTRACT

A cover suitable for covering a food/beverage support. The food/beverage support can be a container, baking sheet or plate. The cover includes a device support to interchangeably carry a user removably attachable power operated air mover unit or a closure. The cover operable to cover the food/beverage support without the air mover unit fan unit when the food/beverage is being heated or stored. The closure can be connected to the device support. The cover also operable to interchange the closure with the air mover unit and connect the air mover unit to the device support. The cover over the food/beverage and with the air mover unit coupled to the device support operable to blow air over food/beverage on the food/beverage support with the air mover unit.

20 Claims, 12 Drawing Sheets

(56) References Cited

U.S. PATENT DOCUMENTS

| | | | |
|---|---|---|---|
| 6,936,795 B1* | 8/2005 | Moon | A47J 37/0629 |
| | | | 219/400 |
| 6,976,371 B2 | 12/2005 | Gleason et al. | |
| 7,946,224 B2* | 5/2011 | McFadden | H05B 6/6473 |
| | | | 219/400 |
| 8,347,781 B2 | 1/2013 | Stack | |
| 10,022,021 B2 | 7/2018 | Sudhir | |
| 2011/0293808 A1 | 12/2011 | Fleming | |
| 2012/0298676 A1 | 11/2012 | Cooks | |
| 2021/0282588 A1* | 9/2021 | Moon | A47J 37/0641 |

FOREIGN PATENT DOCUMENTS

| | | |
|---|---|---|
| JP | 3834343 B2 | 10/2006 |
| JP | 3874343 B2 | 1/2007 |
| KR | 100645981 | 11/2006 |

\* cited by examiner

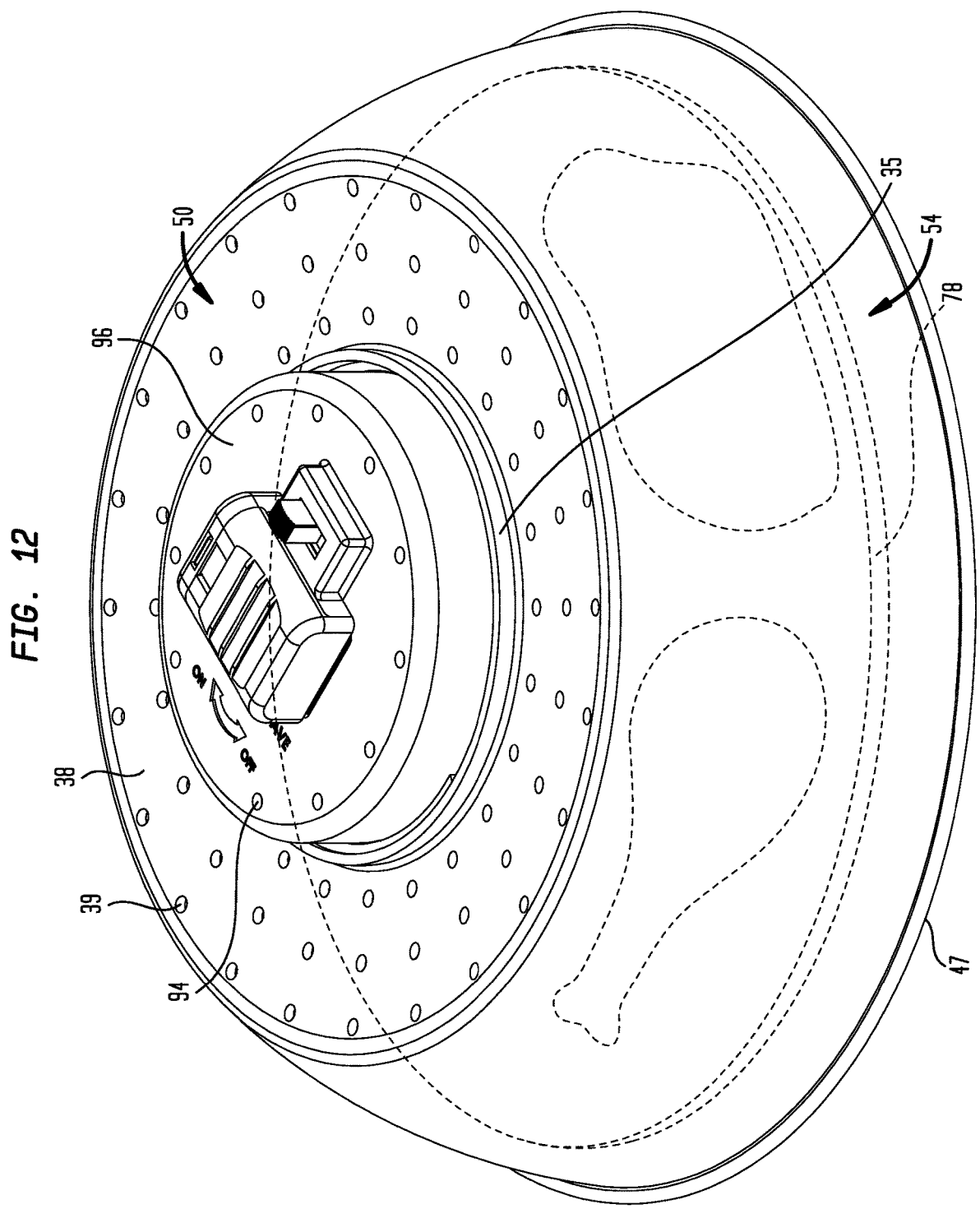

COMBINATION FOOD COOLER AND FOOD COVER

This United States Non-Provisional patent application claims the benefit of U.S. Provisional Patent Application No. 63/014,012, filed Apr. 22, 2020, hereby incorporated by reference herein.

I. FIELD OF THE INVENTION

The present disclosure concerns a cover suitable for covering a food/beverage support. The food/beverage support can be a container, baking sheet or plate. The cover includes a device support to interchangeably carry a user removably attachable power operated and portable air mover unit or a closure. The cover operable to cover food/beverage on the food/beverage support without the air mover unit when a user heats or stores the food/beverage.

II. BACKGROUND OF THE INVENTION

U.S. Pat. No. 4,468,932, Bullard, concerns a portable ice chest, containing removable racks and trays for foods and beverages, replaceable ice cubes and a fan driven by a battery powered motor.

U.S. Pat. No. 5,060,479, Carmi, concerns a thermoelectric apparatus for heating or cooling food and drink containers. The apparatus has at least one compartment for holding a container that is to be heated or cooled and in association therewith a thermoelectric device in intimate contact on the one hand with a concave holder for the container that is being heated or cooled and on the other hand with a heat exchanger having radiator and blower sections. The apparatus is powered by low voltage DC and is suitable for use in motor vehicles.

U.S. Pat. No. 5,062,281, Oliphant et al, concerns an air conditioning device adapted to be used with a cup comprising a lid with a blower assembly means connected to the lid. The lid is removably connectable to an upper end of the cup and the lid has an air entry opening and an air exit opening. The blower blows air into the air entry opening and the air passes into the cup space and over a substance in the cup space to provide an air exit stream. The air exit stream passes from the cup space through the air exit opening for passing a cool air exit stream from the lid. When the substance is a cool substance, the air exit stream is cool and, when the substance is a hot substance, the air exit stream is hot.

U.S. Pat. No. 5,782,094, Freeman, concerns a refrigerated countertop snack container that can be styled in the form of a lidded cookie jar which utilizes a Peltier effect thermoelectric element as the cooling module located beneath the main interior compartment formed by a hygienic thermally-conductive liner that is thermally insulated from the container's outer shell and is held at 38° F. nominal for optimal food refrigeration. The liner is specially designed with tapered thickness to minimize bottom-to-top temperature difference. Heat generated by the refrigeration process is dissipated from a finned aluminum heat sink that is cooled by forced air from a quiet "muffin" fan drawing in air from a first set of air vent openings configured around a lower region of the container, and exhausting air, warmed by the heat sink and fan motor, through a second set of air vents located above the first set.

U.S. Pat. No. 5,953,933, Cheng, concerns a water container and cooling fan assembly including a fan motor base, a cylindrical housing mounted on the fan motor face and covered with a top cover, and a water container put inside the housing, the water container having a plurality of longitudinal turning angles defining with the housing a plurality of longitudinal wind passages through which induced currents of air from a fan in the fan motor base pass, top cover having a smoothly curved wind guide face on the inside adapted for guiding induced currents of air from the longitudinal wind passages to an exhaust port.

U.S. Pat. No. 6,763,665, Clark, concerns a food chiller including an enclosed container supported on a base which receives a flow of cooling air from a Peltier effect thermoelectric module in the base through cool air inlet openings into the container. Air is returned from the container to the base by a fan mounted in the air duct system in communication with the cold sink of the thermoelectric device. In each of the disclosed embodiments, duct length is minimized and air flow into the container is optimized by air hole placement and orientation.

U.S. Pat. No. 8,347,781, Stack, concerns a food cooling device which includes a cover, an electric motor powering a fan, and an automatic switch. The cover defines air intake openings beneath a motor housing, a bottom orifice, and vents between the air intake openings and the orifice. The bottom opening rests on a table, covering a plate containing hot food. A fan blade directs air toward the food, the air cools the food, and the heated air escapes through the vents. The cooling device is portable, light in weight, and easy to operate, making it suitable for use by small children as well as handicapped persons of all ages.

United States Patent publication No. 2011/0293808, Fleming, concerns a handheld device for quickly cooling hot foods and method for using the device to cool hot foods. In particular, the device is comprised of a vessel, a base that is removably attached to the bottom open end of the vessel and a nozzle affixed through the base. The device is configured to hold frozen elements and receive air through the open top end of the vessel. The air becomes chilled as it flows through the frozen elements and exits the device through the nozzle, which is positioned over the hot foods, allowing a user to quickly and easily cool hot foods prior to consumption.

Korean Patent 100645981, Ohyama concerns a container system for microwave oven cooking which includes a main body, a lid, and a cap disposed in a recess in the lid. The cap is movable upward and downward through a limited range in the recess depending on steam pressure, and grooves, formed in a sidewall of the cap, or in a side wall of the recess, allow escape of steam when the cap is moved upward as a result of steam pressure. The lid is also allowed to move upward and downward relative to the main container body in response to steam pressure, and, when the lid is moved upward, an additional path for the escape of steam is provided at the location where the rims of the lid and main body meet each other.

III. SUMMARY OF THE INVENTION

The present disclosure uses the phrase food/beverage to denote food and beverage. The use of food by itself includes the meaning food and beverage.

The invention has advantages. An example of the invention depicts some of the advantages. An example of the invention depicting advantages includes, a cover having a food/beverage covering orientation wherein when the cover resides in the covering orientation, the cover removably resides over a food/beverage support. The cover can be removed from residing over the food/beverage support by a user without hand or power tools; The cover includes a device support connected to a portion of the cover. A self-contained, air mover unit has a carrier connected to a prime mover; the prime mover connected to an air mover; the air mover unit couples to the device support when the air mover unit in a removably installed orientation relative to the device support.

Additionally, the advantages include, structure of the cover enabling (1) orientation of the air mover unit into the removably installed orientation from an unfixed orientation; (2) orientation of the air mover unit into the unfixed orientation from the removably installed orientation and (3) removal of said air mover unit from said device support when said air mover in said unfixed orientation, said orientation and removal without requiring use of hand tools or power tools.

Also, advantageously, the cover includes an end wall having an interior surface and an exterior surface. A delimited open area opens through the end wall's interior and exterior surface. A plurality of vent holes extends through the exterior and interior end wall surfaces about the delimited open area. An external sidewall has interior and exterior surfaces which extend away from the end wall. The external sidewall, which is synonymous with the phrase exterior sidewall, extends about an interior sidewall. The interior sidewall delimits the delimited open area.

Advantageously, an air path, when the air mover unit resides in the removably installed orientation, delimited by portals opening through a portion of the air mover unit carrier provides a path for air. Further the air path includes a conduit fluidly connected to the portals, and an air mover of the air mover unit fluidly connected to the conduit. The air path also includes an interior void space delimited by interior surfaces of the end wall and external side wall. The interior void space fluidly connects to the air mover. Also, the air path includes vent holes fluidly connected to the interior void space.

Also, advantageously, a closure connects to the device support when the closure resides in a removably installed orientation with a portion of the cover. The closure installation blocks the air mover unit from residing in the removably installed orientation when said closure resides in the removably installed orientation with the cover portion.

Finally, an example of an advantage includes the closure having a positional relationship with the delimited open area selected from a group of positional relationships consisting of the following positional relationships: the closure in the delimited open area, the closure over the delimited open area, the closure opposite the delimited open area, and combinations thereof. The closure interchanges with the air mover unit.

Naturally, further objects and advantages of the invention are disclosed throughout other areas of the specification, drawings, and claims.

IV. BRIEF DESCRIPTION OF THE DRAWINGS

Figure 7:
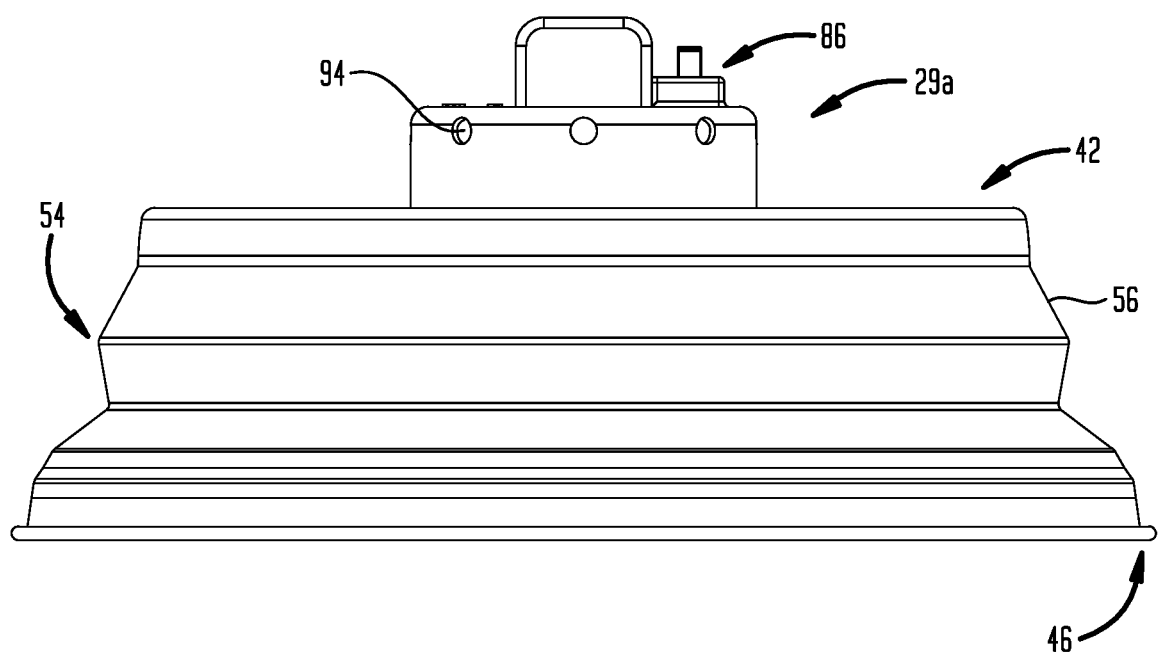
FIG. 7 depicts a side view of the structure shown in FIG. 3 with the fan unit attached.
Figure 8:
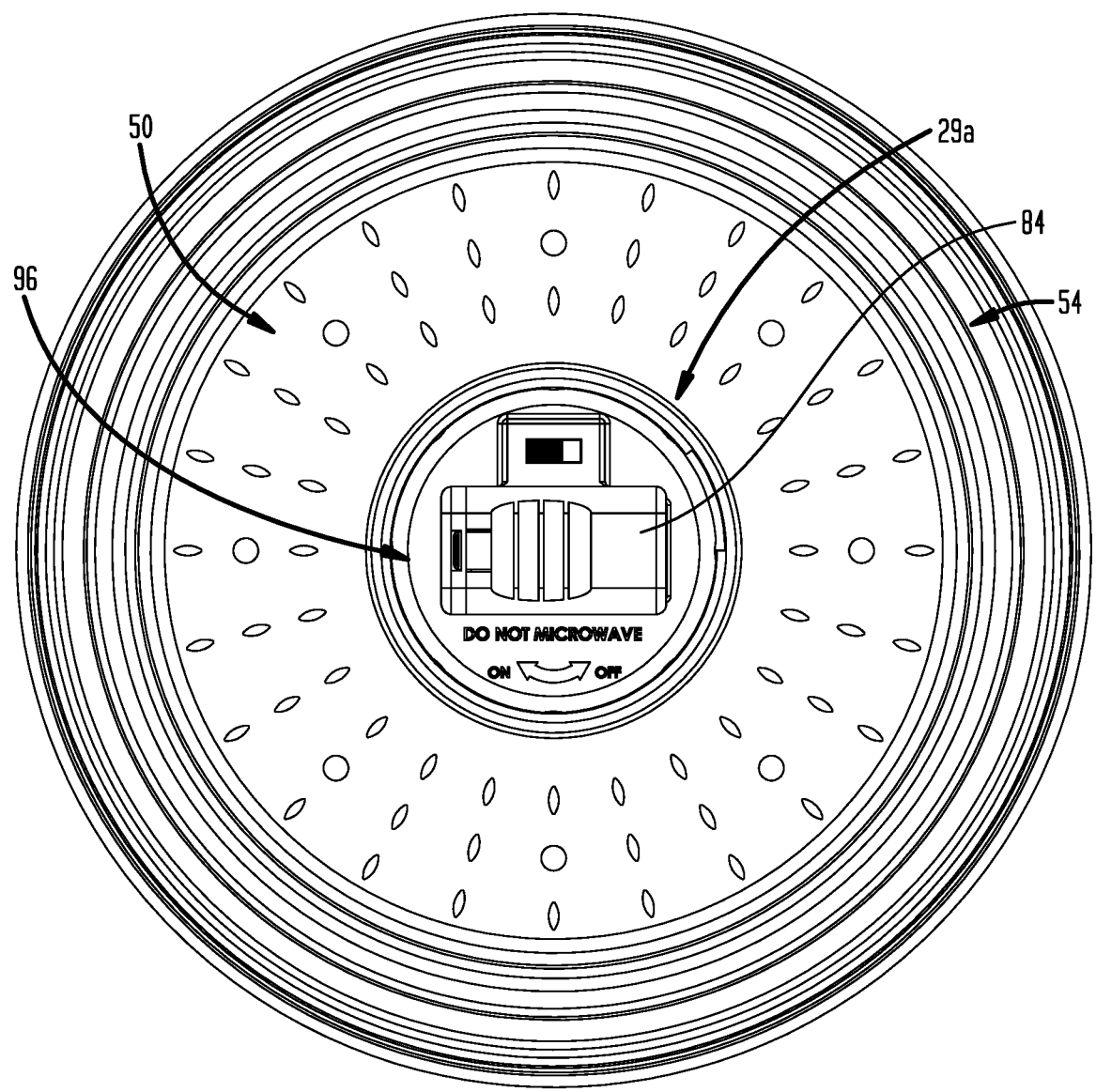
FIG. 8 depicts a top view of the structure shown in FIG. 7.
Figure 9:
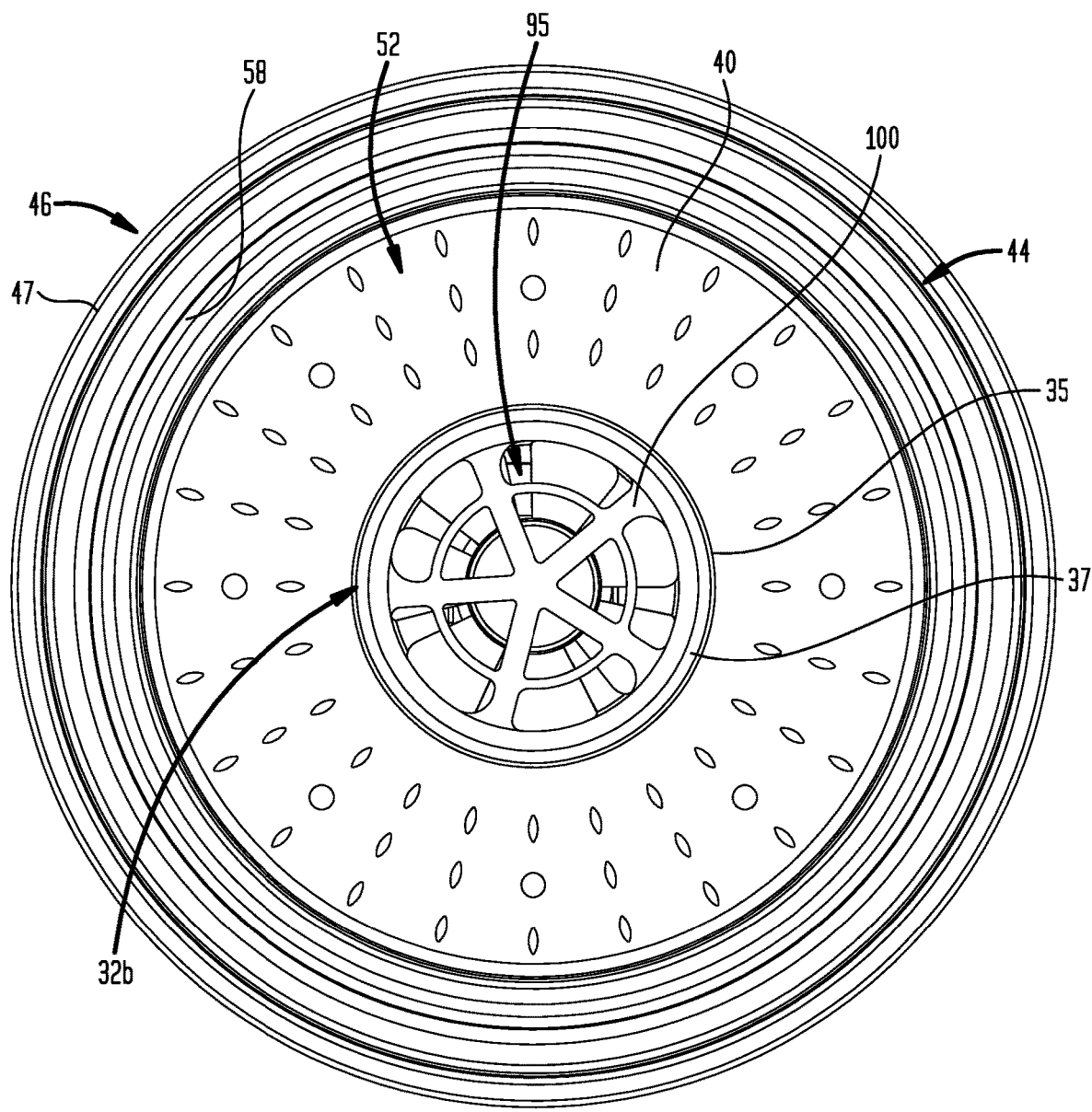
FIG. 9 depicts an underside view looking into an underside of the cover with the fan unit attached to the cover as shown in FIG. 8.
Figure 10:
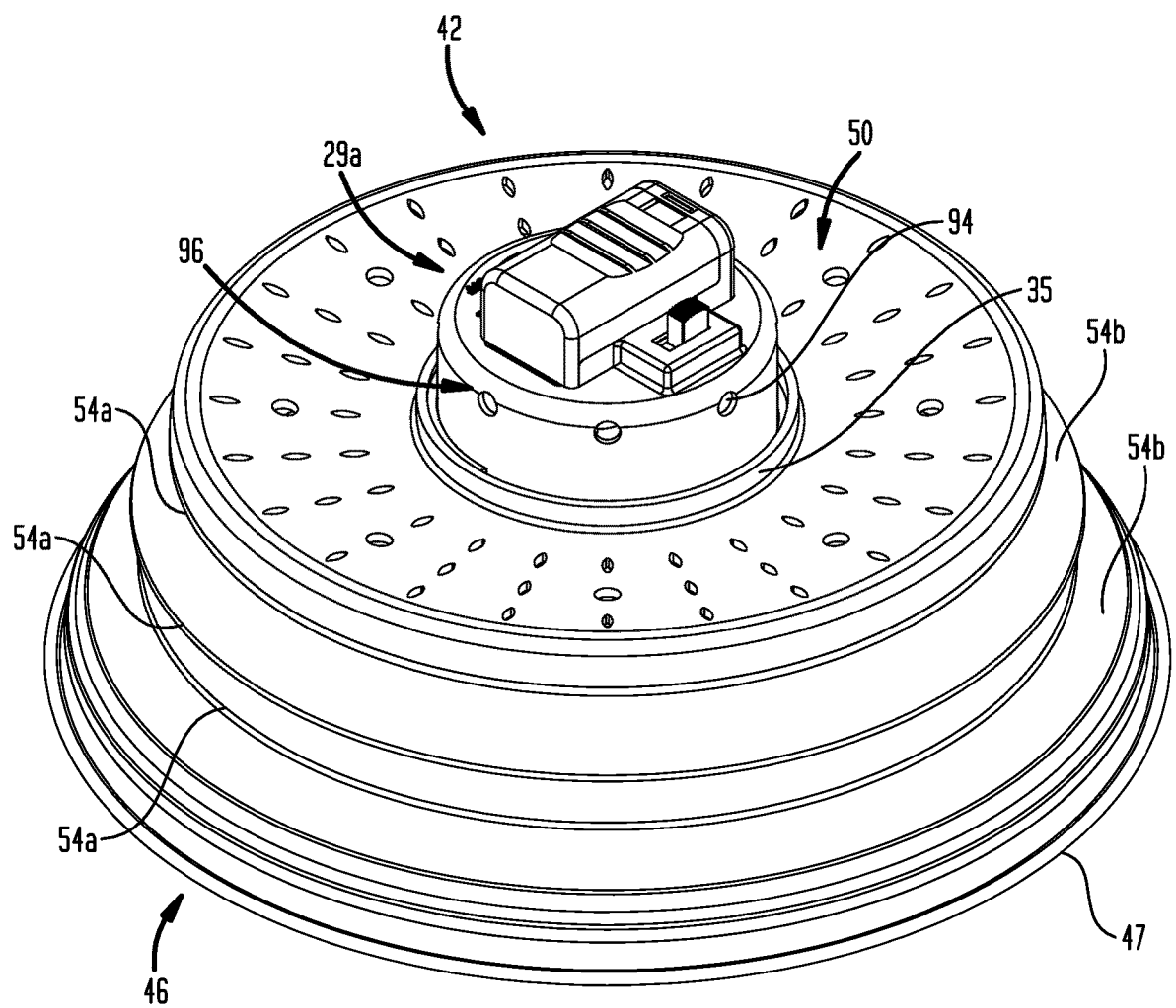
FIG. 10 depicts an isometric view of the structure shown in FIG. 8.
Figure 11:
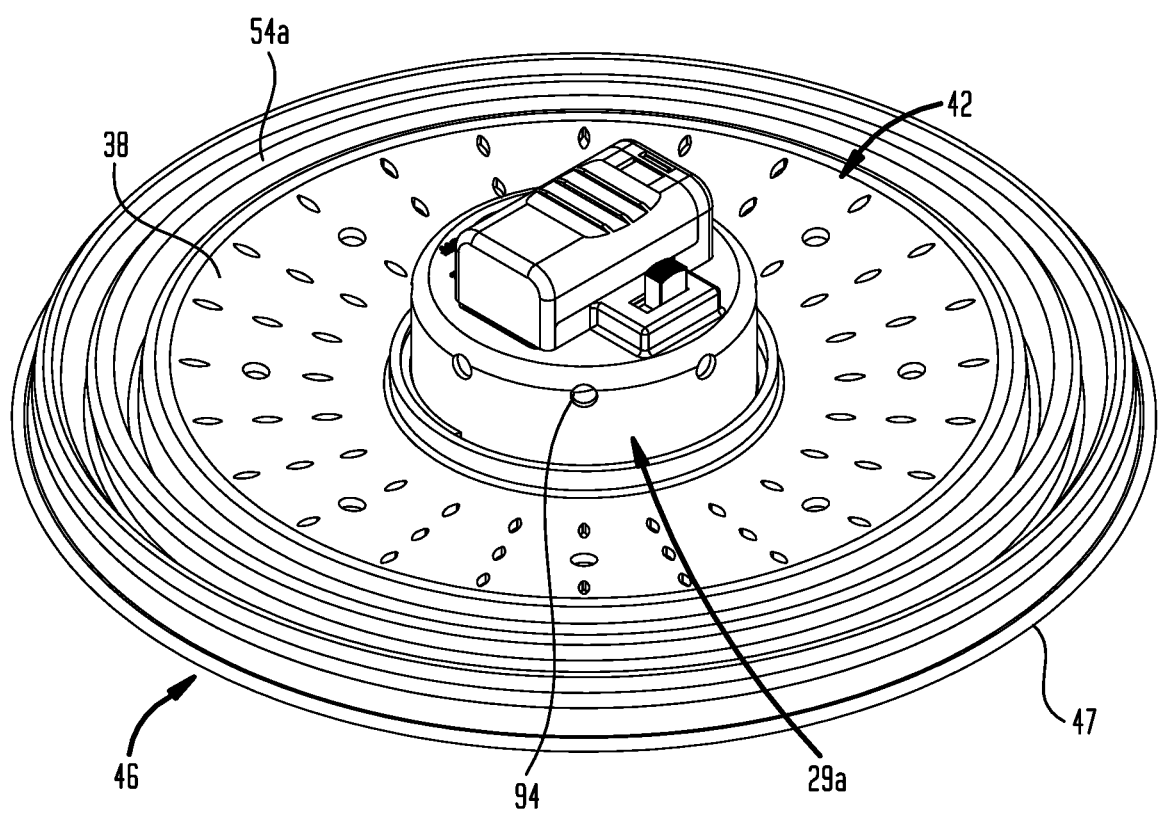
FIG. 11 depicts an isometric view of the covering shown in FIG. 10, except the side wall depicted in FIG. 10 resides in a collapsed state as opposed to the non-collapsed state shown in FIG. 10.

FIG. 12 depicts an isometric view of a covering like the covering of FIG. 10 except the fan unit of FIG. 7 differs from the fan unit of FIG. 10 in that the air intakes of the air mover unit extend through an upper of the unit's carrier as opposed to through a side surface of the carrier as shown in FIG. 10; additionally the sidewall of the covering of FIG. 12 has a non-collapsible fixed height as opposed to the collapsible wall shown in FIG. 10.

V. DETAILED DESCRIPTION OF THE INVENTION

Figure 1:
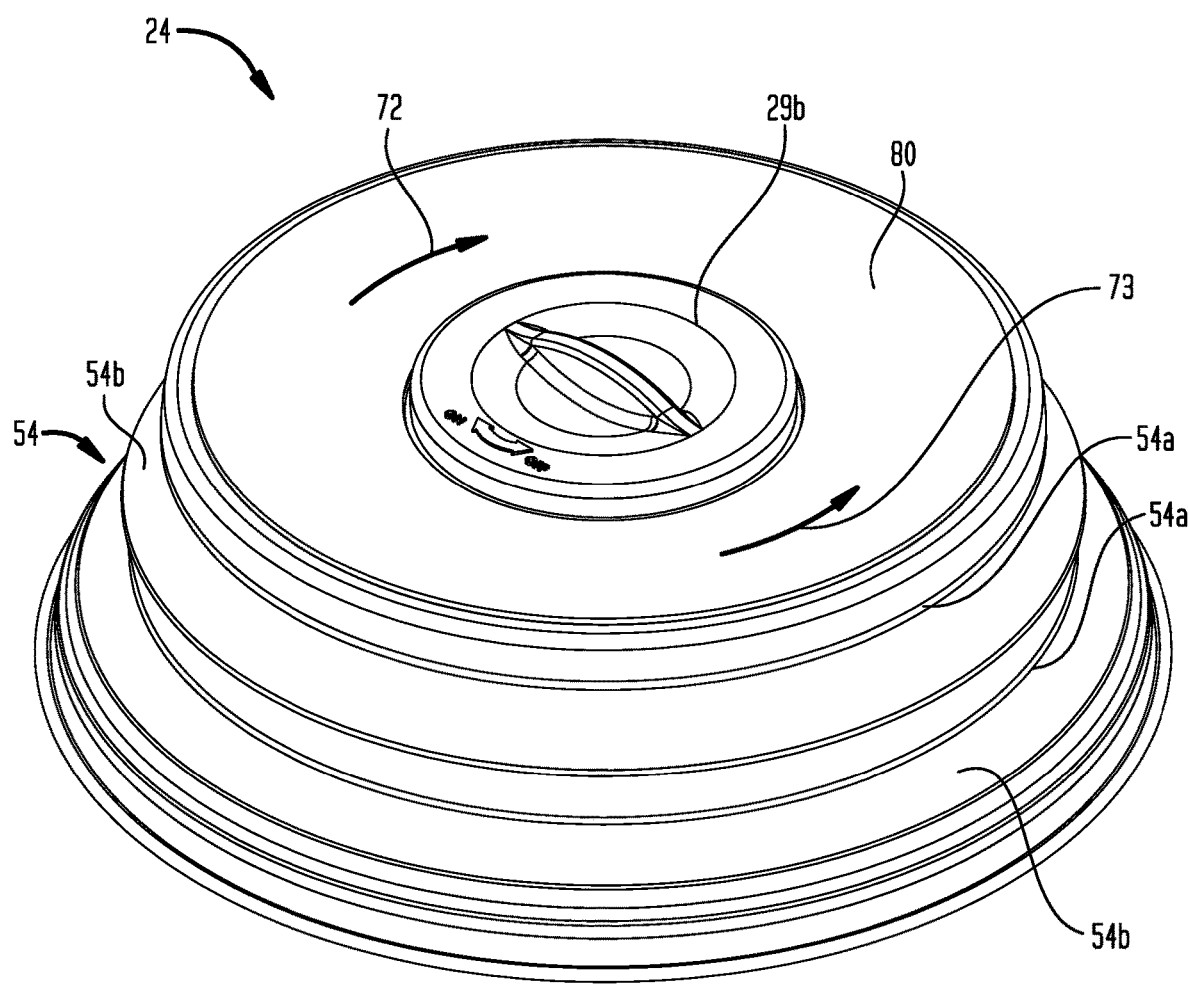
FIG. 1 depicts an isometric view of a covering of the present disclosure having a closure over an opening through an end wall of the cover; and an overlay over vent holes arranged about the closure.
Figure 2:
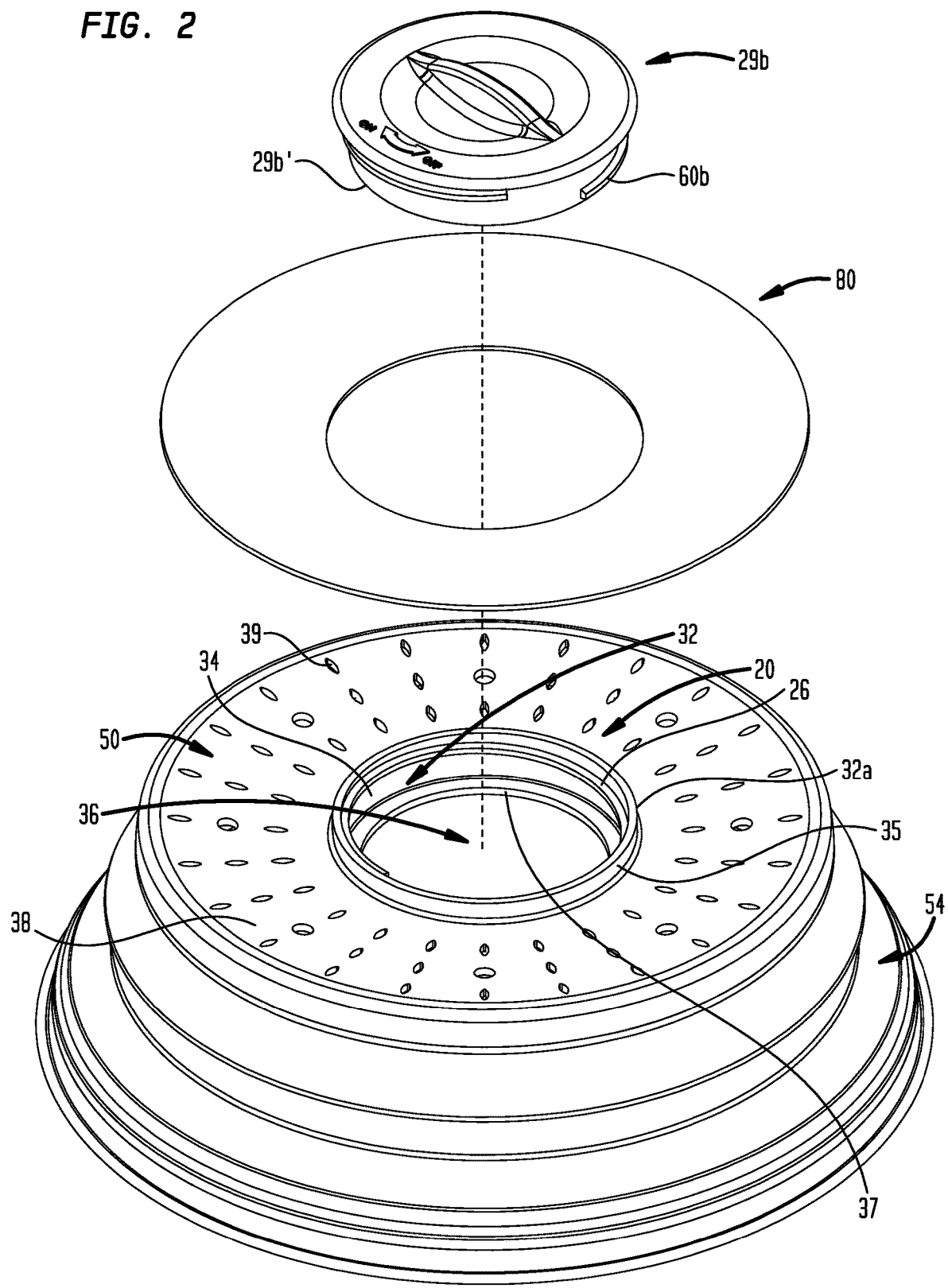
FIG. 2 depicts an exploded view of the structure of FIG. 1 wherein the closure hovers off the opening and the overlay hovers off the vent holes.
Figure 3:
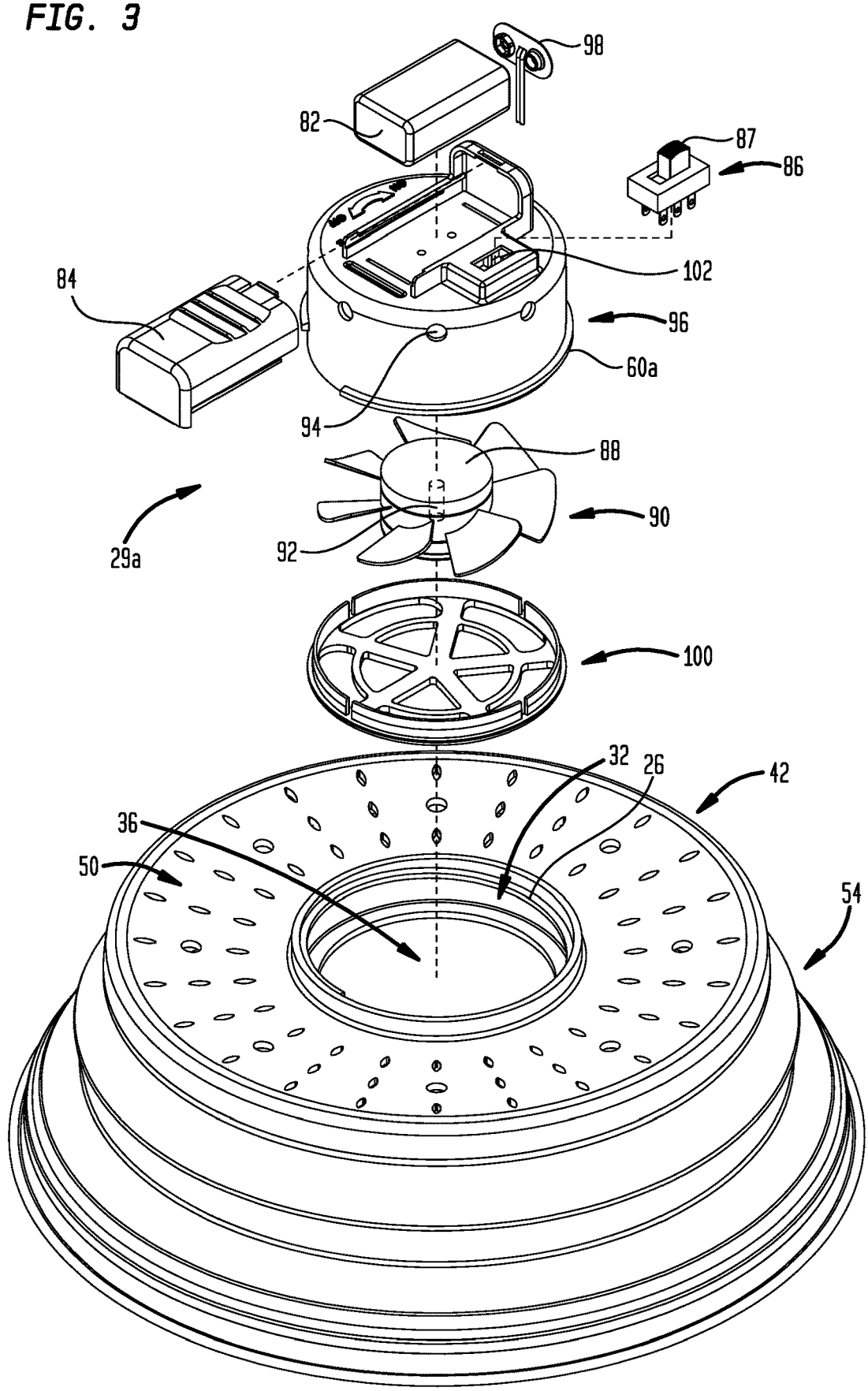
FIG. 3 depicts a covering like the covering of FIG. 1 except a removably attachable air mover unit is exploded and over the opening in place of the closure over the opening; also the overlay has been removed from the coving.
Figure 4:
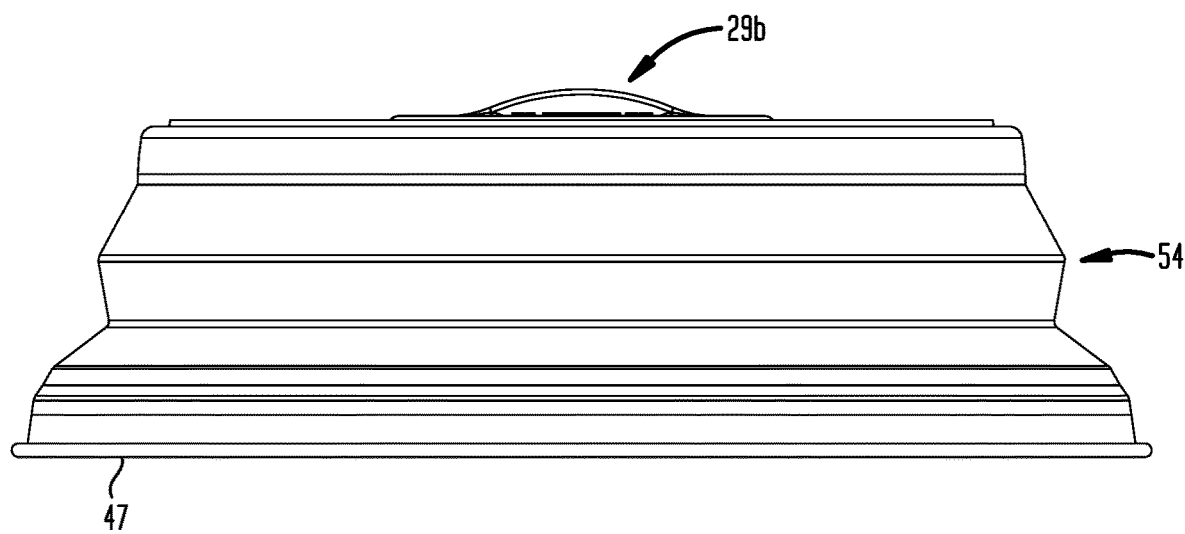
FIG. 4 depicts a side view of the cover shown in FIG. 1.
Figure 5:
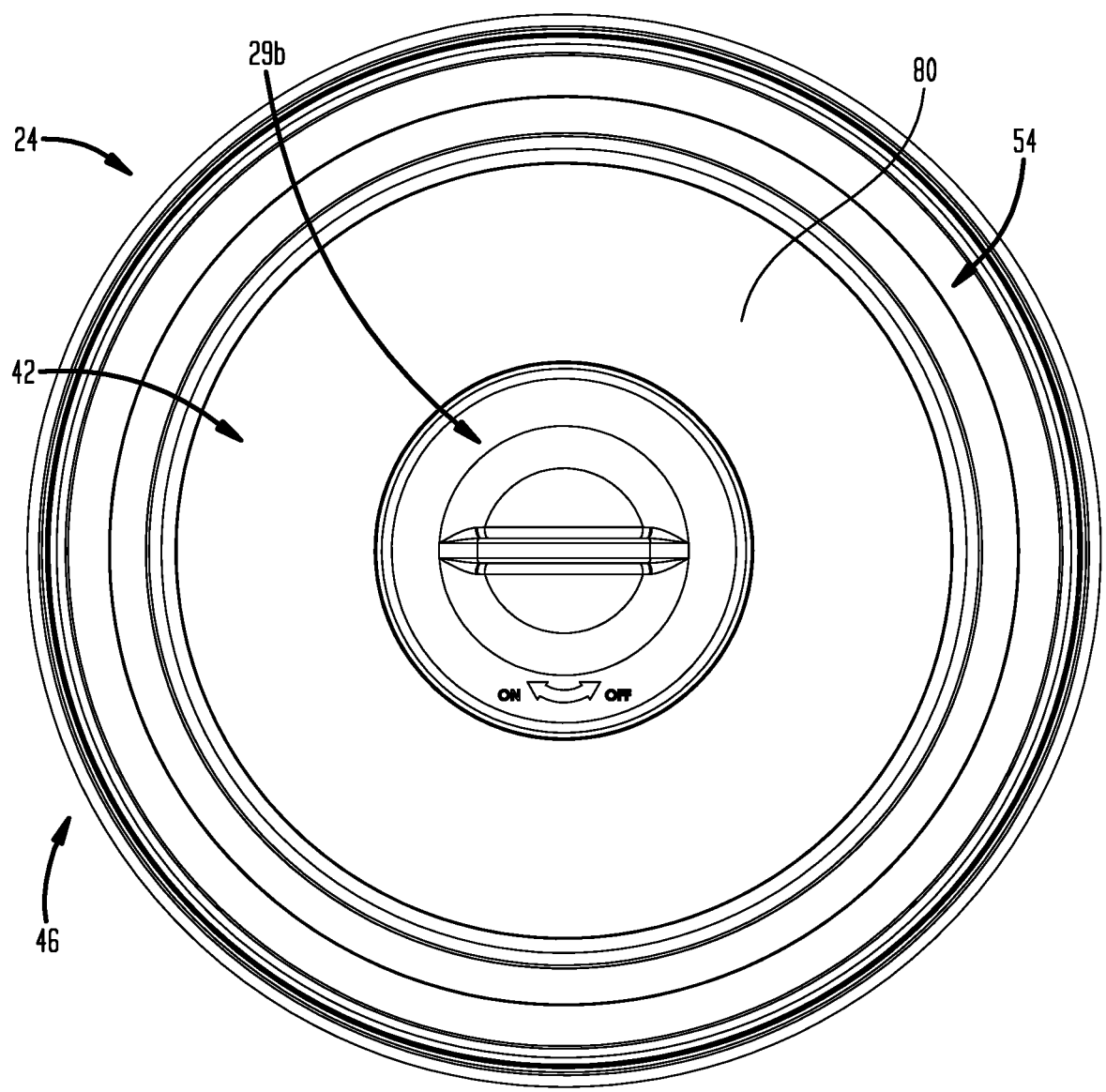
FIG. 5 depicts a top view of the covering shown in FIG. 1.
Figure 6:
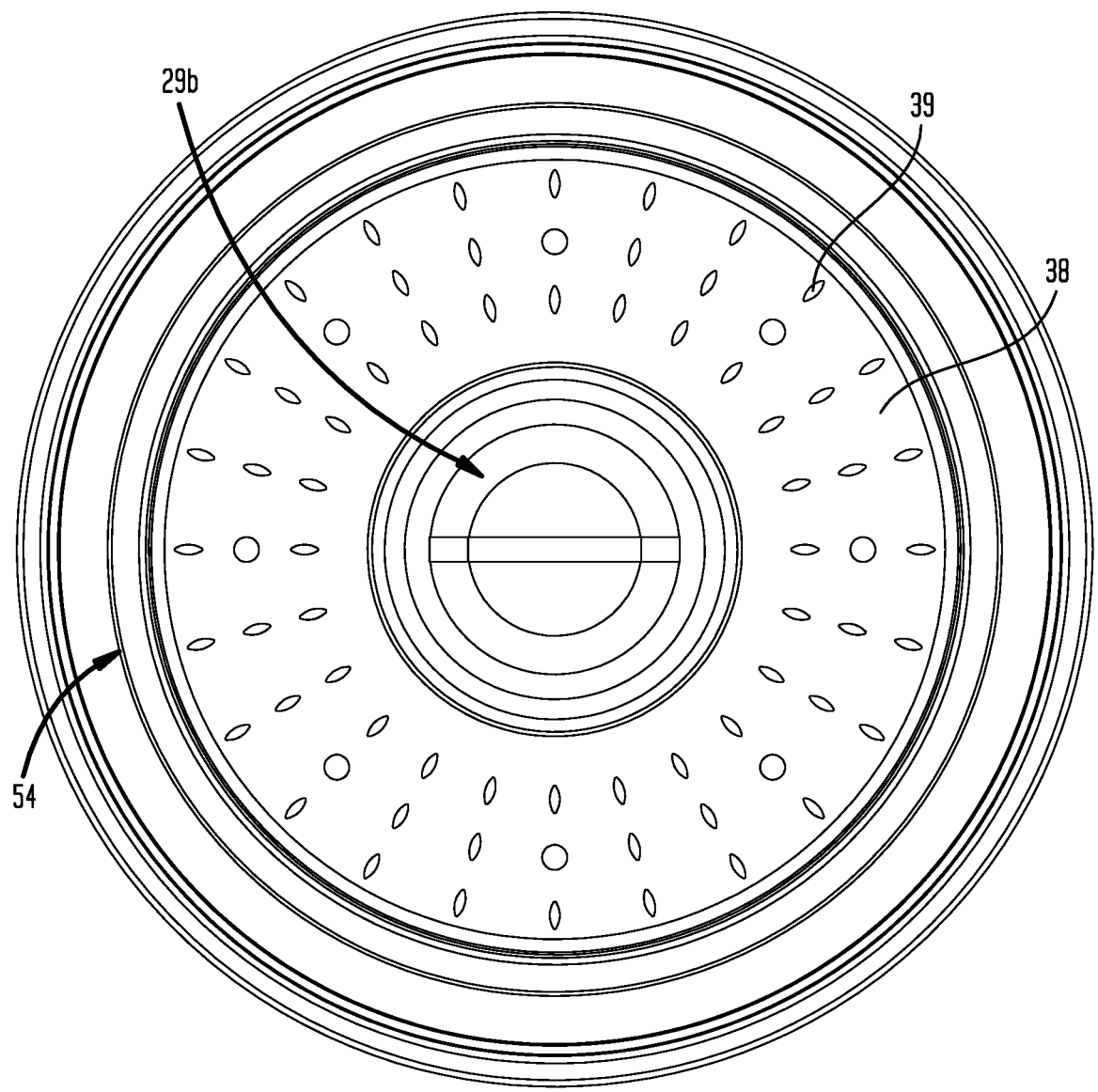
FIG. 6 depicts a top view of the covering shown in FIG. 1; except FIG. 6 has the overlay removed to expose the vent holes.

Referring to FIGS. 1-3 a cover 24 suitable for covering a food/beverage support 78 is depicted. The food/beverage support 78 can be a container, baking sheet or plate. The cover 22 includes a device support 20 to interchangeably carry a user removably attachable power operated air mover unit 29*a* or a closure 29*b*. The cover 24 operable to cover the food/beverage support 78 without the air mover unit 29*a* when the food/beverage is being heated or stored. The closure 29*b* can be connected to the device support 20. The cover also operable to interchange the closure 29*b* with the air mover unit 29*a* and connect the air mover unit to the device support. The cover 24 over the food/beverage and with the air mover unit 29*a* coupled to the device support 20 operable to blow air over food/beverage on the food/beverage support 78 with the air mover unit 29*a*.

The device support (20) of the cover (24) includes first coupling (26) to couple to device (29*a*; 29*b*). The first coupling (26) couples the device (29*a*; 29*b*), such as the air mover unit (29*a*) or closure (29*b*) to the cover. The first coupling (26) can comprise structure which include abutments, mates, snaps, press fits and/or threads. In the present example the coupling can be first threads, which can be female threads which can include curved and angled projections (26). An interior sidewall (32) forms the first projections. The delimiting surface of the projections can be formed from an interior surface (34) of the interior sidewall (32). The interior surface (34) delimits a delimited open area (36). The first projections (26) extend into the interior void space of the delimited open area (36). The interior sidewall (32) also has an exterior surface (35). The interior sidewall (32) and first projections (26) comprise at least part of the device support (20). The device support (20) can be an air mover support and a closure support.

The interior sidewall (32) extends away from an exterior surface (38) at a second end (42) of the cover (20). The interior sidewall (32) extends towards a cover first opening (44) and a cover first end (46). The first opening (44) of the cover resides at the first end (46) of the cover. The first opening (44) provides an access into a cover interior void space (52).

The delimited open area (36) opens through an end wall (50) of the cover. The end wall has an outer perimeter. The interior sidewall (32) and delimited open area (36) reside within the outer perimeter of the end wall (50). The delimited open area (36) opens through the exterior surface (38) of the end wall (50) and the interior surface (40) of the end wall (50). The interior surface (40) of the end wall (50) delimits the cover interior void space (52) and forms part of the cover interior which forms a domed interior. The interior sidewall (32) extends away from the end wall interior surface (40) and exterior surface (38) into the cover interior void space (52) and towards the cover first opening (44). The interior side wall (32) has a first end (32a) spaced away from the end wall exterior surface. A first access leads into the delimited open area (36) at or proximate the first end (32a) of the interior sidewall. The delimited open area (36) has a second end at a second end (32b) of the interior sidewall (32). At the second end (32b) a projection (37) extends into the interior of the delimited open area (36). The second end (32b) delimits a second access to the delimited open area. The projection (37) forms a seat upon which an installed closure (29b) or installed air mover unit (29a) seats. The second end (32b) of the interior sidewall (32) can be spaced away from the interior surface (40) of the end wall (50).

The end (47) of an exterior sidewall (54) of the cover (24) delimits the cover first opening (44) at the first end (46) of the cover (24). The end (47) of the sidewall (54) resides about the first opening (44). The end (47) can be a free end of the sidewall (54) and can be at the first end (46). The sidewall (54) has an exterior surface (56) delimiting an external boundary of the cover. The exterior sidewall (54) has an interior surface (58) delimiting the cover interior void space (52) and forming part of the cover interior and the cover domed interior. The exterior surface (35) of the interior sidewall (32) opposite the interior surface (58) of the sidewall (54). The exterior sidewall (54) extends away from the end wall exterior (38) and interior (40) surfaces. The exterior sidewall (54) extends from the end wall (50) perimeter to the cover first end (46). A void space exists between the perimeter formed by the exterior surface (35) of the interior side wall (32) and the interior surface (58) of the sidewall (54). The perimeter formed by the exterior surface (35) of the interior sidewall (32) can be extended by reference to the cover first opening. The exterior sidewall end (47), and the exterior sidewall internal surface (58) fall outside the perimeter formed by the exterior surface (35) of the interior sidewall (32) extended by reference to the cover first opening. The interior sidewall (32) and a delimited open area (36) fall within the perimeter formed by the exterior sidewall end (47), and the exterior sidewall internal surface (58). The cover first end (46) is opposite the cover second end (42).

The air mover unit (29a) and closure (29b) each have a second coupling (60a; 60b). The second coupling (60a; 60b) can include structure which comprises abutments, mates, snaps, and/or threads. In the present example the structure can be second threads which can be male threads which can include curved and angled second projections. The devices, when their second projections (60a; 60b) are mating with, engaging with, interlocking with and slidably engaging with the first projections 26 place the air mover unit or closure in a removably installed orientation with the device support (20). The device (29a; 29b), when in a removably installed orientation, is in a fixed orientation.

To place the air mover unit (29a) or closure (29b) in a removably installed orientation, a user inserts the device (29a; 29b) (closure or air mover unit) into the delimited open area (36). The device (29a; 29b) can be in contact with a portion of cover (24) and over and opposite and in the delimited open area (36). More particular it extends through the first access at the first end (32a). The device (29a; 29b) can be over and opposite the first access. The device (air mover unit (29a) or closure (29b)) reside in a removably unfixed orientation when the device (29a; 29b) can be over and opposite the delimited open area (36) and in contact with the cover (24) and more particularly over and opposite the first access and extending through the first access at the first end (32a). The device can be in contact with a portion of the cover. The device (29a; 29b) in the unfixed orientation can be removed off the portion of cover (24) it contacts and out the delimited open area (36) without rotating the device (29a; 29b) relative to the cover (24).

To orient the device (29a; 29b) into a removably installed orientation, a user seats the device on the device support, over and opposite the delimited open area (36) and in the delimited open area (36). The device is in the unfixed orientation. The user then moves the unfixed device (29a; 29b) relative to the cover end wall (50) in a first fixing direction (72). The movement slides the second projections (60a; 60b) relative to the first projections (26) until the projections stop sliding under normal force. At this point a bottom of the air mover (29a), such as an end wall formed by a blade guard (100), or an end wall (29b') of the closure (29b), sits on the seat (37) at the second end (32b) of the internal sidewall (32). The fixed device (29a; 29b) resides in the removable installed orientation. In the fixed orientation (removably installed orientation) the device (29a; 29b) cannot be removed from the first access at the first end (32a) and cover (24), by a user, until a user reorients the device (29a; 29b) into an unfixed orientation. To reorient the device to an unfixed orientation, a user simply moves the device in a second unfixing direction (73) counter to the first direction (72). The movement slides the first (26) end second (60a; 60b) projections along each other. The movement unfixes the device, and thus the device resides in the unfixed orientation. When the device resides in the unfixed orientation a user can remove the device (29a; 29b) from and off the device support of cover (24) without further rotation. The closure (29b) and air mover unit (29a) are interchangeable with the cover's device support (20) and each can connect with the cover's device support and each can couple with the device's coupling structure (26) as described above. A user can install and uninstall the closure (29b) and air mover unit (29a) without the use of hand or power tools.

A user when using the cover (24) to cover a food/beverage support (78) having food/beverage thereon, such as plated food/beverage, to be heated or stored, or such as a container having food/beverage therein to be heated or stored, disposes the cover (24) over and/or on the container of the food/beverage or disposes the cover over and/or on the plate having the food/beverage. The cover (24) does not have to be disposed on the food/beverage support (78). The exterior sidewall end (47) of the cover (24) can extend outside of, exterior to, and about a perimeter of the food/beverage support (78). The user can optionally install the closure (29b). The closure (29b) removably installed resides in the fixed orientation. In the ready to heat orientation the cover is on and/or over the container or plate having the food or beverage therein or thereon. As explained above, the cover does not have to be on the food/beverage support. The sidewall (54) of the cover (24) can be about the perimeter of the food/beverage support (78). The cover is without and lacks the air mover unit (29a) installed thereon. The cover optionally includes the closure (29b) thereon and in the installed orientation. The cover further optionally includes an overlay (80) which seats on the cover and covers a plurality of air vents (39). More particularly the air vents (39) extend through the exterior surface (38) and interior surface (40) of the cover end wall (50) and extend through the end wall. The vents (39) group about the delimited open area (36). The overlay (80) can be an annular sheet of rubber. The vents can also or alternatively extend through the sidewall 54. The cover (24) in the ready to heat orientation can have all of its structure and components microwave and dishwasher safe.

The cover (24), in a ready to cool orientation can have the cover over a food/beverage support such as a heated plate of hot food/beverage or such as a container containing hot food/beverage. The food/beverage is believed to be done by being previously heated by the user. The cover of course can be absent from being over the food support. The cover (24) can be positioned to remove the closure (29b), if installed, and install the air mover unit (29a). If the closure is installed, a user removes the closure (29b) from the cover (24). To remove, the user moves the closure (29b) in the second unfixing direction (73) to place the closure in the unfixed orientation. The user then removes the closure (29b) from the portion of the cover with which it contacts. The user then installs the air mover unit (29a) in place of the closure (29b). Of course, if the cover (24) lacks the closure (29b) the user omits the closure removal. The user installs the air mover unit (29a) to the cover device support (20). The user, to begin to install the air mover unit to the cover orients the air mover unit (29a) over, opposite and in the delimited open area (36). The user to begin the orientation inserts the air mover unit into the delimited open area through the first access at the first end (32a) of the interior sidewall. The user orients the air mover unit (29a) into the fixed orientation by moving the unit in the fixing direction (73). The unit resides in a removably installed orientation when fixed in place. If not already installed, a user can install into the air mover unit a portable power source (82) such as a portable battery which can be rechargeable. Accordingly, when the cover (24) is in a ready to cool orientation the air mover unit (29a) is in the removably installed orientation and the power source is connected to a portion of the air mover unit. A battery coving (84) can reside over the battery (82). The air mover unit (29a), is ready to run and resides in an operable state.

When in an operating state, the air mover unit's switch (86) has been actuated to enable energy from the power source (82) to powerup the unit's prime mover (88), such as an electric motor. The powered-up motor rotates the air mover (90) by way of rotating the axial driver (92) connected to the air mover (90) such as a fan blade or a blower blade. The rotating blade blows and draws air into the cover interior void space (52), which can be a dome interior void space, from an exterior of the cover and over the hot food. Heat from the food transfers to the air blowing and circulating over the food. The heated air can then blow out from the air vents (39) which should have the overlay (80) removed therefrom. The air being blown circulates around the cover interior void space (52) of the cover and out the air vents (39). If the cover (24) simply has an end wall (50) disposed over a food/beverage support 78 in the form of a container of food/beverage; the blown air circulates over the food/beverage in the container. Thus as made clear by the above description and accompanying drawings and added for emphasis the apparatus forms a food/beverage cooling apparatus.

In more detail the air passing from the exterior of the cover to the cover interior void space (52) travels along an air path. The air path includes the air entering a plurality of air ports (94) delimited by structure forming said air mover unit. The structure can be the carrier (96). The carrier can include conduit (95). The conduit (95) can be formed from the carrier (96). The air after passing through the ports (94) can enter the conduit. The conduit can have the air mover (90) in the form of a blower blade such as a fan blade. The blade can include a vented ring fixedly connected to end tips of the blade. The air, after passing over the food/beverage, exits the cover through the air vents (39). Thus as made clear by the above description and accompanying drawings the air forms a food and beverage cooling air flow.

In more detail the air mover unit (29a) can be a self-contained user portable unit and can be a portable module to install on the device support (20) of cover (24). The self-contained unit can be a blower unit such as a fan unit. The self-contained unit includes the prime mover (88) which can be an electric motor. The motor can be a brushless DC motor. The motor can be disc like. The motor includes an axial driver (92) coupled to an air mover (90). The air mover can be a blower blade such as a fan blade. A carrier (96) of the unit connects to the prime mover (88). The carrier (96) can connect to a user removably attached power source (82) such as a portable battery. The battery can be rechargeable. The battery when installed, can be connected to the carrier (96) and an electronic contact (98). The electronic contact can be electronically connected to the prime mover (88). A blade guard (100) can be connected to the carrier (96). The blade guard (100) can form part of the conduit (95). A battery cover (84) can cover the battery and be connected to the carrier (96). The carrier can form part of the conduit (95). The carrier can be or form part of a housing. The self-contained air mover unit (29a) can have further circuitry (102) connected to the power source (82). The circuitry includes a switch (86) which when actuated enables power to flow from the power source (82), to the motor, and power the motor (88) which turns the blade (90). The switch (86) can include a user activated on/off actuator (87). The switch can also be heat temperature actuated. The self-contained air mover unit (29a) can include further circuitry connected to the power source, such as the rechargeable battery, which allows the battery to be recharged by connecting the circuitry to a user removably attachable power cord. The power cord can have a jack or plug or inlet at one end which connects to the circuitry. The power cord can have a jack or plug or inlet at one end which connects to the external power source. The jack, plug or inlet can be a USB type.

The sidewall (54) of the cover (24) can have an adjustable feature. The adjustable feature allows a user to reduce the height of the cover from a first height to a second height. The second height has a length less that the first height. The length is measured from the sidewall end (47) to the exterior surface (38) at the perimeter of the end wall (50). The adjustable feature enables height adjustment without the use of any hand or power tools. The adjustable feature can be self-contained with the cover and formed as part of the cover. In the present example the adjustable feature includes a collapsible sidewall (54). The collapsible sidewall (54) has a plurality of fold lines (54a). Each fold line can be between adjacent annular wall sections (54b). A user adjusts the height of the cover from a first height to the second height by applying a first force in a first direction against the cover second end (42) towards the first end (46) or vice versa. The force causes the exterior surface 56 of the adjacent annular wall sections (54b) to move towards one another. The movement shortens the height of the cover. One adjusts the height of the cover from the second height to the first height by applying a second force in a second direction against the cover first end (46) away from the cover second end (42) or vice versa. The force causes the exterior surface (56) of the adjacent annular wall sections (54b) to move away from one another. The movement lengthens the height of the cover. The described height adjustments occur by a user without the aid of hand or power tools.

As can be easily understood from the foregoing, the basic concepts of the present invention may be embodied in a variety of ways. The invention involves numerous and varied embodiments of a cover having a closure interchangeable with an air mover unit and methods for making and using such embodiments.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "cover" should be understood to encompass disclosure of the act of "covering"—whether explicitly discussed or not—and, conversely, were there effectively disclosure of the act of "covering", such a disclosure should be understood to encompass disclosure of a "cover" and even a "means for covering". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The tem' "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the cover, its air mover unit, and its closure herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An apparatus, comprising:
a cover defining a delimited open area to removably reside over a food/beverage support;
a device support connected to a portion of said cover;
wherein an air mover unit when removably installed to said device support resides in a removably installed orientation with said device support; and
wherein upon operation, said air mover unit draws air from an exterior of the cover through a plurality of air ports and circulates said drawn in air in a void space delimited by said cover and on said food or beverage support when said cover resides over said food or beverage support;
wherein said apparatus forms a food or beverage cooling apparatus; and
wherein said device support has a structure enabling:
orientation of said air mover unit into said removably installed orientation from an unfixed orientation;
orientation of said air mover unit into said unfixed orientation from said removably installed orientation; and
removal of said air mover unit from said device support when said air mover in said unfixed orientation, said orientations and removal without requiring use of hand tools or power tools.

2. The apparatus of claim 1, wherein said air mover unit comprises a carrier connected to a prime mover, said prime mover connected to an air mover.

3. The cover of claim 1, wherein said device support forms a device support coupler, wherein said carrier forms a carrier coupler, said device support coupler and carrier coupler mateably engage to removably install said air mover unit in said device support.

4. The apparatus of claim 1, wherein said air mover unit when disposed in said removably installed orientation has a positional relationship with said delimited open area selected from a group of positional relationships consisting of: said air mover unit in said delimited open area, said air mover unit over said delimited open area, said air mover unit opposite the delimited open area, and combinations thereof.

5. The apparatus of claim 1, further comprising:
a coupling structure forming part of said device support, said coupling structure connects said air mover unit to said device support when said air mover unit resides in said removably installed orientation.

6. The apparatus of claim 5, wherein said coupling structure selected from a group of coupling structures consisting of: abutting structure, mating structure, snap fit structure, press fit structure, thread structure, and combinations thereof.

7. The apparatus of claim 6, wherein said coupling structure comprises:
curved and angled projections.

8. The apparatus of claim 7, further comprising:
a sidewall delimiting the curved and angled projections.

9. The apparatus of claim 8, wherein said sidewall has an interior surface delimiting said curved and angled projections.

10. The apparatus of claim 4, wherein said interior surface of said sidewall delimits said delimited open area.

11. The apparatus of claim 3, further comprising:
a coupling connected to a portion of said carrier, said coupling connected to said portion of said carrier in slidable engagement with said coupling structure of said device support during orientation of said air mover unit into said removably installed orientation from an unfixed orientation.

12. The apparatus of claim 1, wherein said air mover unit comprises a self-contained blower unit.

13. An apparatus, comprising:
a cover defining a delimited open area to removably reside over a food or beverage support;
a device support connected to a portion of said cover;
wherein an air mover unit when removably installed to said device support resides in a removably installed orientation with said device support;
a closure disposable in a removably installed orientation with said device support of said cover, said air mover unit blocked by said closure in said removably installed orientation from residing in said removably installed orientation with said device support;
wherein upon operation, said air mover generates an air flow in a void space delimited by said cover when said cover resides over said food or beverage support;
wherein said air mover unit when disposed in said removably installed orientation has a positional relationship with said delimited open area selected from a group of positional relationships consisting of: said air mover unit in said delimited open area, said air mover unit over said delimited open area, said air mover unit opposite the delimited open area, and combinations thereof;
said device support enabling:
orientation of said air mover unit into said removably installed orientation from an unfixed orientation;
orientation of said air mover unit into said unfixed orientation from said removably installed orientation; and
removal of said air mover unit from said device support when said air mover in said unfixed orientation, said orientations and removal without requiring use of hand tools or power tools.

14. The apparatus of claim 13, wherein when said closure disposed in said removably installed orientation with said device support, said closure includes a positional relationship with said delimited open area selected from a group of positional relationships consisting of said closure in said delimited open area, said closure over said delimited open area, said closure opposite said delimited open area, and combinations thereof.

15. The apparatus of claim 13, wherein said closure interchangeable with said air mover unit.

16. An apparatus, comprising:
a cover defining a delimited open area to removably reside over a food/beverage support;
a device support connected to a portion of said cover;
wherein an air mover unit when removably installed to said device support resides in a removably installed orientation with said device support; and
wherein upon operation, said air mover unit draws air from an exterior of the cover through a plurality of air ports and circulates said drawn in air in a void space delimited by said cover and on said food or beverage support when said cover resides over said food or beverage support;
wherein said apparatus forms a food or beverage cooling apparatus; and
wherein said cover has a cover structure enabling:
orientation of a closure into a removably installed orientation with said device from an unfixed orientation with said device support;
orientation of said closure into said unfixed orientation from said removably installed orientation; and
removal of said closure from said device support cover when said closure in said removably installed orientation without requiring use of hand tools or power tools.

17. The apparatus of claim 16, wherein said cover structure forms a device support coupler.

18. The cover of claim 17, further comprising:
a closure coupler connected to a portion of said closure, said closure coupler connects said closure in slidable engagement with said device support coupler of said device support during orientation of said closure into said removably installed orientation from said unfixed orientation.

19. An apparatus, comprising:
a cover defining a delimited open area to removably reside over a food/beverage support;
a device support connected to a portion of said cover;
an air mover coupled said device support;
wherein upon operation, said air mover unit draws air from an exterior of the cover through a plurality of air ports and circulates said drawn in air in a void space delimited by said cover and on said food or beverage support when said cover resides over said food or beverage support;
wherein said apparatus forms a food or beverage cooling apparatus; and
wherein said plurality of air ports are delimited by structure forming said air mover unit, and air from said air drawn though said air ports circulated on said food and beverage support exits said void space through air vents delimited by said cover, said air from said air drawn though said air ports circulated on said food or beverage support providing a food or beverage cooling air flow.

20. An apparatus comprising:
a cover defining a delimited open area to removably reside over a food or beverage support;
a device support connected to a portion of said cover;
an air mover unit when removably installed to said device support resides in a removably installed orientation with said device support;
an end wall having an interior surface and an exterior surface, said delimited open area opens through said end wall's interior and exterior surface;
a plurality of vent holes extending through exterior and interior surfaces of said cover;
an exterior sidewall having interior and exterior surfaces extends away from said end wall, said exterior sidewall extends about an interior sidewall, said interior sidewall delimiting said open area;
an air path when said air mover unit in said removably installed orientation, said air path delimited by portals opening through a portion of said carrier, a conduit fluidly connected to said portals, an air mover of said air mover unit fluidly connected to said conduit, an interior void space delimited by said interior surfaces of said end wall and exterior sidewall fluidly connected to said air mover, and said vent holes fluidly connected to said interior void space;
a closure connects to said device support when said closure in a removably installed orientation with said device support, said air mover unit blocked by said closure from residing in said removably installed orientation when said closure in said removably installed orientation with said cover;
wherein said air mover unit when disposed in said removably installed orientation has a positional relationship with said delimited open area selected from a group of positional relationships consisting of: said air mover unit in said delimited open area, said air mover unit over said delimited open area, said air mover unit opposite the delimited open area, and combinations thereof;
said device support has a structure enabling:
orientation of said air mover unit into said removably installed orientation from an unfixed orientation;
orientation of said air mover unit into said unfixed orientation from said removably installed orientation;
removal of said air mover unit from said device support when said air mover in said removably installed orientations without requiring use of hand tools or power tools;
wherein upon operation, said air mover generates an air flow in a void space delimited by said cover when said cover resides over said food or beverage support;
wherein when said air mover unit in said removably installed orientation with said device support, said closure blocked from residing in said removably installed orientation;
wherein when said closure disposed in said removably installed orientation, said closure includes a positional relationship with said delimited open area selected from a group of positional relationships consisting of said closure in said delimited open area, said closure over said delimited open area, said closure opposite said delimited open area, and combinations thereof; and
said closure interchangeable with said air mover unit.

* * * * *